May 23, 1944. J. R. THORP 2,349,474
FAN
Filed Nov. 24, 1941
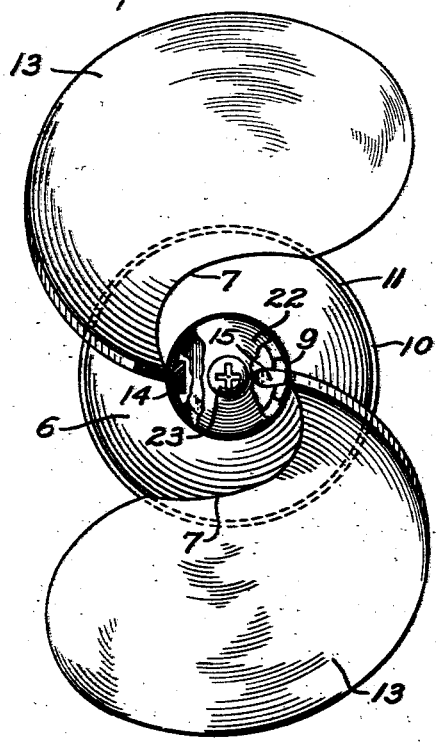

Patented May 23, 1944

2,349,474

UNITED STATES PATENT OFFICE 2,349,474

FAN

Joel R. Thorp, West Allis, Wis., assignor to The Fulton Company, West Allis, Wis., a corporation of Wisconsin Application November 24, 1941, Serial No. 420,159

9 Claims. (Cl. 170—173)

This invention relates to improvements in fans, and more particularly to improvements in the construction and operation of fan assemblages having blades formed of pliable material such as rubber and blade supporting hubs formed of sheet metal; and the present application is a continuation in part of my copending application Serial No. 394,083, filed May 19, 1941.

An object of the invention is to provide an improved rubber bladed fan assemblage which is simple and durable in construction, and which is also highly efficient in operation.

Rubber bladed fans have recently become quite popular for various purposes, and while it has heretofore been proposed to produce a fan assemblage having two or more flexible rubber blades mounted in an ovoid hub portions of which could be formed of sheet metal with the aid of punches and dies, it has been necessary in these prior structures to form the hub support as a solid metal sleeve attachable to the propelling motor shaft with the aid of a set screw or the like. As shown in my prior application above referred to, I have previously made it possible to form the ovoid outer portion of the fan hub of a single blank of sheet metal provided with two or more helical spiral blade receiving slots the outer ends of which were closed while their inner ends were open for insertion or removal of the individual blades. Although this prior fan hub assembly has proven highly practical and successful in actual commercial use, the central hub supporting sleeve thereof had to be formed of a solid piece of metal, and it was necessary to utilize a set screw coacting with the sleeve and shaft within the ovoid portion of the hub for the purpose of attaching the hub assemblage to the driving shaft. This formation of the supporting sleeve and provision of an attaching set screw, not only increased the cost of manufacture, but also made it necessary to dismantle the hub structure in order to gain access to the totally concealed set screw.

It is therefore an object of my present invention to provide an improved sheet metal hub for a rubber bladed fan or the like, which can be readily constructed, assembled and dismantled, and wherein the blades can be easily inserted and are firmly retained in position against the action of centrifugal force induced therein.

Another object of this invention is to provide an improved sheet metal hub assemblage composed of several associated parts, all of which with the possible exception of a standard assembly screw, may be formed of sheet metal with the aid of punches and dies.

A further object of the invention is to provide an improved ovoid fan hub formed of sheet metal and having two or more spiral helical blade receiving and retaining slots, the outer ends of which are closed so as to positively limit outward shifting of the blades along the ovoid surface, while the inner ends of the slots are provided with enlarged blade inserting openings for facilitating application and removal of the several independent blades.

Still another object of the present invention is to provide an improved fan assembly wherein the hub may be frictionally attached to the propelling shaft, without utilizing attaching screws or wedging elements such as heretofore employed for such purposes.

An additional object of my present invention is to provide an improved fan hub structure formed of relatively few durable and inexpensive parts adapted to be conveniently assembled, and which present a neat and attractive appearance when finally united.

Another object of this invention is to provide a sturdy dynamically balanced sheet metal fan hub, which can be readily and firmly attached to a driving shaft, and which may also be manufactured in diverse sizes at moderate cost.

These and other specific objects and advantages will be apparent from the following detailed description.

A clear conception of the several features constituting the present improvement, and of the mode of constructing fans built in accordance with the invention, may be had by referring to the drawing accompanying and forming a part of this specification in which like reference characters designate the same or similar parts in the various views.

Fig. 1 is a longitudinal section through a two blade fan hub assembly embodying the invention, showing fragments only of the blades and of the propelling motor;

Fig. 2 is a front elevation of the two blade fan assembly, drawn to slightly reduced scale and with portions broken away to show the blade attachment;

Fig. 3 is a somewhat enlarged perspective view of the improved sheet metal hub attaching sleeve, reversed with respect to the disclosure thereof in Fig. 1;

Fig. 4 is a fragmentary end view of the hub showing the structure for positively and permanently closing the outer ends of the blade retaining slots;

Fig. 5 is another fragmentary outside view of the larger end of the ovoid hub portion, showing the structure of Fig. 4 with the adjacent fan blade shown in section; and Fig. 6 is an exploded central section through the improved hub assembly, the central supporting sleeve having been omitted.

While the invention has been shown and described herein as being specifically embodied in rubber bladed fans having semi-ovoid hubs adapted to support two or more independent flexible blades, it is not desired to thereby unnecessarily restrict the scope or utility of the improvement.

Referring to the drawing, the improved fan hub assemblage shown therein, comprises, a semi-ovoid shaped hub portion or member 6 provided with two or more spiral-helical blade receiving slots 7 the outer ends of which are permanently closed but may terminate in splits 8 while the inner ends are open and terminate in rather wide transverse openings 9; a ring member or end plate 10 having a continuous annular groove 11 coacting with the peripheral outer rear edge 12 of the ovoid member 6 to centralize the same; a group of pliable or flexible rubber blades 13 each having an enlarged base portion 14 fitted within one of the slots 7, and being provided with an inner or forward end projection 15 extending through the adjacent hub opening 9; a split central supporting sleeve 16 having integral outwardly extending lobes 17 at one end adapted to coact with the dished central portion of the plate 10, and being provided at its opposite end with an internally threaded integral end wall 18, while the medial portion of the sleeve 16 is formed with a slot 19 adapted to coact with a projection 20 formed on the driving shaft 21; a nose plate or cap 22 formed to coact with the front smaller end of the ovoid member 6 adjacent to the forward open ends of the slots 7 so as to engage and conceal the blade projections 15; and a central clamping screw 23 coacting with the cap 22 and with the sleeve end wall 18, to clamp the hub in assembled condition.

The hub member 6, rear centering plate 10, supporting sleeve 16, and front end cap 22 are all formed of sheet metal with the aid of punches and dies, and each of these sheet metal elements is produced from a single unitary blank of sheet metal. The ovoid outer hub member 6 may be produced from a flat blank having a series of radiating spiral sector shaped cut-outs disposed symmetrical with respect to a central axis and forming intervening similar shaped equally spaced lobes. The inner ends of these cut-outs terminate in the transverse openings 9, and the corresponding outer portions of the lobes may be provided with extensions 24 while the opposite outer portions of the lobes have projections 25 thereon which definitely determine the width of the slots 7 when the blank is pressed into ovoid shape. The center of each of these outer hub blanks is provided with a circular hole 26 for permitting insertion of the clamping sleeve 16, and when the blank has been finally distorted into proper ovoid shape, the outer peripheral edge 12 thereof will be disposed in a plane perpendicular to the hub axis, while the inner or front ends of the blade confining slots 7 will be open and freely accessible for blade insertion by virtue of the inward dishing or distortion of the central portion 27 of the blank. If so desired, the adjacent lobes of the ovoid hub portion or member 6 may also be rigidly and permanently interconnected at the outer rear edge 12, by welding the lobe extensions 24 to the interiors of the adjoining lobes at the projections 25, as shown in Figs. 4 and 5, to thereby close the slits 8 and to facilitate assembly of the entire hub.

The rear centering and closure plate 10 may likewise be produced from a single sheet of metal with the aid of punches and dies, and the annular recess or groove 11 is shaped to snugly engage the outer rear edge 12 of the ovoid member 6. The centering plate 10 may be dished inwardly as shown in Fig. 1, in order to somewhat re-enforce and stiffen the same, and the center of this plate is provided with an opening 28 having slightly larger diameter than the outside diameter of the hub supporting sleeve 16.

The formation of the supporting sleeve 16 of a single blank of sheet metal with the aid of punches and dies, is an important feature of this invention, and this split sleeve 16 has slightly smaller internal diameter than that of the driving shaft 21, so that when the resilient sleeve is pushed endwise onto the shaft it will be expanded and will thereafter frictionally retain the hub in position. As the sleeve 16 is driven onto the shaft 21, the shaft lug or projection 20 will ride along the sleeve slot 19 and will eventually engage the end of this slot so as to properly locate the hub relative to the shaft, and the projection 20 will thereafter serve as a key to prevent the hub from rotating with respect to the drive shaft 21. The ears or lobes 17 and the end wall 18 are formed integral with the sleeve 16, and the wall 18 is provided with a central internally threaded opening with which the clamping screw 23 is adapted to coact.

The nose plate or cap 22 is also formed of sheet metal and is adapted to coact with the smaller end of the hub member 6 so as to close the openings 9, and with the blade projections 15 to clamp the blades 13 in place. The center of this plate 22 is preferably provided with a tapered hole as shown, for reception of the head of the clamping screw 23, and this screw is of standard construction and is the only element of the hub assembly which is not formed of sheet metal.

After the various elements of the hub structure have been properly constructed, it is a simple matter to assemble the improved fan. The individual blades 13 may be inserted within the slots 7 through the openings 9 at the forward or inner ends of these slots. The end ring 10 may then be applied to the edge 12 of the ovoid member 6, and the sleeve 16 may thereafter be inserted within the central opening 28 of the ring plate 10 until the ears 17 engage the outer surface of this plate. The clamping screw 23 after having been inserted within the cap 22, may then be applied to the screw threads of the sleeve wall 18, and as the screw 23 is driven home, the cap 22 will snugly engage and will clamp the blade projections 15 while the sleeve lobes 17 will simultaneously pull the end ring 10 firmly against the hub end edge 12. The assembled rotor may thereafter be forced upon the end of a driving shaft 21 as shown in Fig. 1, and will be frictionally attached to the shaft in the proper position. Removal of the rotor assembly may obviously be just as easily effected.

From the foregoing detailed description, it will be apparent that my present invention provides an improved fan hub assemblage which is simple, compact, and durable in construction, and which is dynamically balanced so as to produce smooth rotation of the fan. The various elements of the improved rotor assemblage can be readily produced at moderate cost with the aid of simple machinery such as punches and dies, and the entire hub structure may be effectively clamped and retained in assembled condition with the aid of but one simple clamp screw. The improved hub may also be readily applied to or removed from a driving shaft without utilizing any clamping screws or wedges, and the improved formation of the blade retaining slots in the ovoid hub member, facilitates application of the blades and insures firm retention thereof in proper position during normal rotation of the fan. The nose cap 21 at the smaller end of the hub, performs the dual function of locking the blades in place and of closing the openings 9, and this plate 22 together with the rear end plate 10, co-operate with the central sleeve 16 so as to insure rigid uniting of the hub assembly.

It should be understood that it is not desired to limit this invention to the exact details of construction, or to the precise mode of use of the device herein shown and described, for various modifications within the scope of the claims may appear to persons skilled in the art.

I claim:

1. In combination, a hollow semi-ovoid hub member having an integral flat portion at its smaller end and spiral-helical blade receiving slots terminating short of the larger end of said member and being provided with enlarged blade insertion openings at the periphery of said flat portion, an annular centering plate having a groove coacting with the larger end of said member and being provided with a central opening, a longitudinally split supporting sleeve piercing said central opening and said flat hub portion and having integral lobes coacting with said plate, and clamping means coacting with said sleeve and with the front of said hub member, said clamping means comprising a disk engaging said hub member near the periphery of said flat portion to close said blade insertion openings and a screw coacting with said disk and with an end wall of said sleeve to maintain the hub in assembled condition.

2. In combination, a hollow semi-ovoid sheet metal hub member having an integral peripherally dished flat portion at its smaller end and spiral-helical blade receiving slots the outer ends of which are closed and terminate short of the larger end of said member while their inner ends terminate in enlarged openings in the dished periphery of said flat portion, a sheet metal ring member having a groove coacting with the larger end of said hub member, a driving shaft, a sheet metal supporting sleeve frictionally embracing said driving shaft and coacting with said ring member to hold the latter against said hub member, a sheet metal plate coacting with the smaller end of said hub member near the periphery of said flat portion and providing a closure for said enlarged openings, and clamping means connecting said plate and said sleeve.

3. In combination, a hollow semi-ovoid sheet metal hub member having an integral flat portion at its smaller end and spiral-helical blade receiving slots the outer ends of which are closed and terminate short of the larger end of said member while their inner ends terminate in enlarged openings adjacent to the periphery of said flat portion, a sheet metal ring member having a groove coacting with the larger end of said hub member, a driving shaft, a sheet metal supporting sleeve frictionally embracing said driving shaft and coacting with said ring member to hold the latter against said hub member, a sheet metal plate coacting with the smaller end of said hub member and providing a closure for said enlarged openings, and a single clamping screw coacting with said plate and with an end wall of said sleeve in axial alinement with the latter to maintain the hub in assembled condition.

4. In combination, a hollow semi-ovoid hub member having an integral peripherally dished flat portion at its smaller end and spiral-helical blade receiving slots the outer ends of which are closed and terminate short of the larger end of said member while their inner ends terminate in transverse openings in the dished periphery of said flat portion, a ring member having an annular groove coacting with the larger free end of said hub member, a supporting sleeve having a bore formed for coaction with a driving shaft and coacting with said ring member to hold the same against said hub member, a cap coacting with the dished periphery of said flat portion and providing a closure for said openings, and clamping means interposed between said cap and said sleeve.

5. In combination, a hollow semi-ovoid hub member having an integral central flat portion at its smaller end and spiral-helical blade receiving slots the outer ends of which are closed and terminate short of the larger end of said member while their inner ends terminate in transverse openings at the periphery of said flat portion, a ring member having an annular groove coacting with the larger free end of said hub member, a supporting sleeve having a bore formed for coaction with a driving shaft and coacting with said ring member to hold the same against said hub member, a cap coacting with the periphery of said flat portion and providing a closure for said openings, and a single clamping screw coacting with said cap and with an end wall of said sleeve in axial alinement with the latter to maintain the hub in assembled condition.

6. In combination, a hollow semi-ovoid hub member having an integral inwardly dished smaller end portion and blade receiving slots provided with closed outer ends and with open inner ends, blades insertible within said slots through said inner ends adjoining said dished portion, a driving shaft having a projection thereon, a longitudinally split supporting sleeve coacting with the larger end of said open hub member and having a longitudinal slot therein co-operable with said shaft projection, a closure cap coacting with the dished portion of said hub member to provide a closure for said open slot ends, and clamping means interposed between said cap and said sleeve.

7. In combination, a hollow semi-ovoid hub member having an integral inwardly dished smaller end portion and blade receiving slots provided with closed outer ends and with open inner ends adjoining said dished portion, blades insertible within said slots through said open inner ends, a driving shaft having a projection thereon, a longitudinally split supporting sleeve coacting with the larger end of said hub member and having a longitudinal slot therein co-operable with said shaft projection, a closure cap coacting with the dished portion of said hub member to provide a closure for said open slot ends, and a clamping screw coacting with said cap and with an integral end wall of said sleeve in axial alinement with the latter to maintain the hub in assembled condition.

8. In combination, a hollow semi-ovoid hub member having an integral inwardly dished smaller end portion and blade receiving slots provided with permanently closed outer ends and with enlarged open inner ends adjoining said dished portion, rubber blades insertible in said slots only through said open inner ends, a driving shaft having a projection thereon a longitudinally split resilient supporting sleeve formed for frictional engagement with said driving shaft and being directly engageable with said shaft projection to prevent relative rotation of the sleeve and shaft, a closure cap for said open slot ends coacting with said dished portion, and a clamping screw coacting with said cap and with an integral end wall of said sleeve to maintain the hub in assembled condition.

9. In combination, a hollow semi-ovoid shell having an inwardly dished and flattened apex portion provided with a central opening, said shell also having blade receiving slots extending away from said dished portion, said slots having enlarged openings formed in the dished portion, a ring member having an annular groove coacting with the larger free end of said shell and also having a central opening, a supporting sleeve snugly fitting said central openings in said flattened shell portion and in said member and being provided with lobes coacting with the rear surface of said member, a cap coacting with the smaller end of said shell to close said openings, and a clamping screw coacting with said cap and with the end of said sleeve member remote from said lobes.

JOEL R. THORP.